(12) United States Patent
Naito et al.

(10) Patent No.: US 11,565,502 B2
(45) Date of Patent: Jan. 31, 2023

(54) BONDING METHOD

(71) Applicant: TOYOTA BOSHOKU KABUSHIKI KAISHA, Aichi (JP)

(72) Inventors: Tatsuo Naito, Aichi (JP); Masakazu Kito, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 425 days.

(21) Appl. No.: 16/699,166

(22) Filed: Nov. 29, 2019

(65) Prior Publication Data
US 2020/0171793 A1 Jun. 4, 2020

(30) Foreign Application Priority Data
Dec. 3, 2018 (JP) .............................. JP2018-226562

(51) Int. Cl.
| | | |
|---|---|---|
| *B32B 7/12* | (2006.01) | |
| *B32B 7/027* | (2019.01) | |
| *B32B 27/08* | (2006.01) | |
| *C09J 179/02* | (2006.01) | |
| *C09J 5/00* | (2006.01) | |
| *C09J 5/04* | (2006.01) | |
| *C09J 5/06* | (2006.01) | |

(52) U.S. Cl.
CPC ............... *B32B 7/12* (2013.01); *B32B 7/027* (2019.01); *B32B 27/08* (2013.01); *C09J 179/02* (2013.01)

(58) Field of Classification Search
None
See application file for complete search history.

(56) References Cited

U.S. PATENT DOCUMENTS

| | | | |
|---|---|---|---|
| 8,091,953 B2 | 1/2012 | Fukui et al. | |
| 2006/0142532 A1* | 6/2006 | Wintermantel | ........ C09J 175/06 528/59 |
| 2010/0331483 A1 | 12/2010 | Briehn et al. | |
| 2011/0187158 A1 | 8/2011 | Fukui et al. | |
| 2016/0326408 A1* | 11/2016 | Suen | ........ C08L 51/06 |
| 2018/0361721 A1 | 12/2018 | Hirokami | |

FOREIGN PATENT DOCUMENTS

| | | |
|---|---|---|
| CN | 101945880 A | 1/2011 |
| CN | 108367548 A | 8/2018 |
| DE | 19924139 A1 * 11/2000 | ......... C08G 18/2081 |
| DE | 102014108671 A | 10/2015 |
| DE | 102014108671 A | 10/2015 |
| DE | 19924139 A | 11/2020 |
| EP | 2930219 A1 * 10/2015 | ............... B32B 1/00 |
| JP | 2010-023694 | 2/2010 |

OTHER PUBLICATIONS

Office Action of corresponding Chinese Application No. 201911198849. 3, dated Jul. 20, 2021, along with English translation.
The Office Action in corresponding Chinese Application No. 201911198849.3 dated Jan. 28, 2022 along with its English translation.
The German Office Action in corresponding German Application No. 102019132474.2 dated Jan. 31, 2022 along with its English translation.
Wikipedia, The free Encyclopedia, Editing status, Oct. 31, 2018.
Müller, Kajetan, O2 permeability of plastic bottles and closures—measurement and modelling of mass transfer processes, Dissertation of the Technical University Munich, 2003.
URL, https://books.google.de/books?id-mr7zb-LJvO4C&pg=PA603 &lpg=PA603&dq-dimethylethanolamin+1%C3%B6slichkeitsparameter &source=bl&ots=PPynvz8z2o&sig= ACfU3U3UTxn02kBvWB21FQxg9DnlfcIpmw&hl=de&sa=X&ved= 2ahUKEwj-6e6_ pMzqAhUiRxUIHbIWDhwQ6AEwAXoECAoQAQ#v=onepage&q= dimethylethanolamin%201%C3%B6slichkeitsparameter&f=false retrieved on Jul. 14, 2020.
Fedors, Robert F., A method for estimating both the solubility parameters and molar volumes of liquids, Polymer Engineering & Science, vol. 14, 1974, No. 2, pp. 147-154.
German Office Action of the corresponding German Application (No. 102019132474.2), dated Jul. 16, 2020, along with the English translation.

* cited by examiner

*Primary Examiner* — Randy P Gulakowski
*Assistant Examiner* — Ha S Nguyen
(74) *Attorney, Agent, or Firm* — Greenblum & Bernstein, P.L.C.

(57) ABSTRACT

Disclosed herein is a bonding method for bonding two adherends using an adhesive main agent that contains a thermoplastic resin having a cross-linkable group and a catalyst. The bonding method includes the steps of forming a main agent layer on one of the adherends; applying a catalyst onto the main agent layer; laminating the main agent layer and another adherend; and heating and pressing a laminated body in a layer thickness direction. Another embodiment of the bonding method may include a step of applying a catalyst onto one of the adherends, a step of forming a main agent layer on a surface onto which the catalyst has been applied, a step of laminating the two adherends, and a step of heating and pressing a laminated body in a layer thickness direction.

10 Claims, No Drawings

BONDING METHOD

CROSS-REFERENCE TO RELATED APPLICATION

The present application claims priority under 35 U.S.C. §119 to Japanese Patent Application No. 2018-226562 filed on Dec. 3, 2018, the disclosure of which is incorporated herein by reference in its entirety.

BACKGROUND OF THE INVENTION

(1) Field of the Invention

The present invention relates to a bonding method for bonding two adherends using an adhesive main agent that contains a thermoplastic resin having a cross-linkable group.

(2) Description of Related Art

Various adhesives are conventionally used to bond various adherends together. Depending on the materials of adherends and the intended use of a bonded body, an adhesive is selected from hot-melt adhesives (see, for example, JP 2010-23694 A), aqueous adhesives, solvent-based adhesives, and the like, and depending on a desired adhesive strength, a synthetic resin or the like serving as a main ingredient of the adhesive is selected. Further, the adhesive to be used is appropriately selected also depending on a method for applying it onto an adherend, a temperature and pressure at which adherends are bonded together, pot life, an open time, and the like.

Among the above-mentioned various adhesives, hot-melt adhesives are very excellent in transport efficiency because their solid content is almost 100%. On the other hand, aqueous adhesives and solvent-based adhesives are poor in transport efficiency because their solid content is often about 50% by mass at most. Further, from an environmental viewpoint, solvent-based adhesives have a problem that organic solvents evaporate in a drying step or the like performed after application onto adherends.

SUMMARY OF THE INVENTION

Hot-melt adhesives are preferred in that their transport efficiency is high and environmental problems caused by organic solvents do not arise at all. Hot-melt adhesives include reactive-type hot-melt adhesives and non-reactive-type hot-melt adhesives. A reactive-type hot-melt adhesive functions as an adhesive by curing a reactive-curable base compound. Therefore, a long pot life results in a long curing time, that is, pot life tends to be a trade-off with an aging time.

On the other hand, a non-reactive-type hot-melt adhesive functions as an adhesive by solidifying a melted thermoplastic resin, or the like. In the case of a non-reactive-type hot-melt adhesive, a melted adhesive is applied onto an adherend, but the melted adhesive is often a melted thermoplastic resin, and therefore has a very high melt viscosity. Therefore, an application method is limited to, for example, a method in which a melted resin is applied onto an adherend with the use of an extrusion molding machine or the like. Further, in order to obtain a bonded body having high heat resistance, a thermoplastic resin having a high melting point needs to be used. In this case, after the adhesive is applied onto one of adherends, the other adherend needs to be bonded thereto as soon as possible. That is, an open time is short. Therefore, the heat resistance of the adhesive tends to be a trade-off with the open time.

In view of the above-described problems of prior arts, it is an object of the present invention to provide a bonding method in which a reactive-type hot-melt adhesive is used to allow a catalyst to permeate into a main agent layer or a main agent film containing an adhesive main agent through contact between them to reduce an aging time required to develop a desired adhesive strength.

The present invention provides the following.

A bonding method for bonding two adherends using an adhesive main agent that contains a thermoplastic resin having a cross-linkable group and a catalyst that promotes formation of a cross-link derived from the cross-linkable group in the thermoplastic resin includes:

a main agent layer forming step in which a main agent layer made of the adhesive main agent is formed; and a catalyst contact step in which the catalyst is brought into contact with a surface of the main agent layer to allow the catalyst to permeate into the main agent layer.

In one embodiment, the bonding method may include:

a main agent layer forming the main agent layer is formed on an adherend surface of one of the adherends;

a catalyst applying step in which the catalyst is applied onto the main agent layer;

a laminating step in which the one of the adherends and another adherend are laminated so that the main agent layer with the catalyst and an adherend surface of the other adherend are caused to abut on each other; and a heating and pressing step in which a laminated body obtained is heated and pressed in a layer thickness direction.

In one embodiment, the bonding method may include:

a catalyst applying step in which the catalyst is applied onto an adherend surface of one of the adherends;

a main agent layer forming step in which the main agent layer is formed on a surface onto which the catalyst has been applied;

a laminating step in which the one of the adherends and another adherend are laminated so that the main agent layer with the catalyst and an adherend surface of the other adherend are caused to abut on each other; and a heating and pressing step in which a laminated body obtained is heated and pressed in a layer thickness direction.

In one embodiment, the bonding method may include:

a main agent layer forming step in which the main agent layer is formed on an adherend surface of one of the adherends;

a catalyst applying step in which the catalyst is applied onto an adherend surface of another adherend;

a laminating step in which the one of the adherends and the other adherend are laminated so that the main agent layer and a catalyst-applied surface of the other adherend are caused to abut on each other; and a heating and pressing step in which a laminated body obtained is heated and pressed in a layer thickness direction.

In one embodiment, the bonding method may include:

a main agent film forming step in which a main agent film made of the adhesive main agent is formed;

a catalyst applying step in which the catalyst is applied onto at least one of surfaces of the main agent film;

a laminating step in which the two adherends are laminated in such a manner that the main agent film with the catalyst is interposed between them; and a heating and pressing step in which a laminated body obtained is heated and pressed in a layer thickness direction.

In one embodiment, the bonding method may include:

a main agent film forming step in which a main agent film made of the adhesive main agent is formed;

a catalyst applying step in which the catalyst is applied onto an adherend surface of at least one of the two adherends:

a laminating step in which the two adherends at least one of which has the catalyst applied thereon are laminated in such a manner that the main agent film is interposed between them; and a heating and pressing step in which a laminated body obtained is heated and pressed in a layer thickness direction.

In one embodiment of the bonding method when a solubility parameter of the adhesive main agent is defined as $SP_1$ and a solubility parameter of the catalyst is defined as $SP_2$, the $SP_1$ and the $SP_2$ satisfy $|SP_1-SP_2|\leq 5$.

In one embodiment of the bonding method, the catalyst may be a compound having a molecular weight of 500 or less.

In one embodiment of the bonding method, the catalyst may be an amine-based compound.

In one embodiment of the bonding method, the amine-based compound may be at least one of bis-(2-dimethylaminoethyl)ether, N,N,N',N'-tetramethylhexamethylenediamine, 1-methyl-4'-(dimethylaminoethyl)piperazine, N,N,N',N'-tetramethylethylenediamine, and N,N-dimethyldodecylamine.

In one embodiment of the bonding method, the main agent layer may have a thickness of 10 to 500 μm.

It is to be noted that the unit of the solubility parameter (SP value) is $(cal/cm^3)^{1/2}$.

According to the bonding method of the present invention, when the main agent layer or the main agent film that contains the thermoplastic resin having the cross-linkable group is brought into contact with the catalyst, the main agent layer or the main agent film exhibits adhesiveness, and thus it is possible to bond the two adherends together.

Further, when $SP_1$ that represents the solubility parameter of the adhesive main agent and $SP_2$ that represents the solubility parameter of the catalyst satisfy $|SP_1-SP_2|\leq 5$, the catalyst more easily permeates into the main agent layer or the main agent film containing the adhesive main agent.

Further, when the catalyst is a compound having a molecular weight of 500 or less, the catalyst uniformly permeates into and diffuses in the main agent layer or the main agent film containing the adhesive main agent, which makes it possible to more easily form an adhesive layer.

Further, when the catalyst is an amine-based compound, a compound whose molecular weight is small can easily be selected, that is, a compound that can easily permeate into the main agent layer or the main agent film containing the adhesive main agent can be selected as the catalyst from a wide range.

Further, when the amine-based compound is at least one of the above-mentioned various compounds, the molecular weight thereof is small, and therefore the compound can easily permeate, as a catalyst, into the main agent layer or the main agent film containing the adhesive main agent.

Further, in a case where the main agent layer or the main agent film has a thickness of 10 to 500 μm, when the catalyst is brought into contact with the main agent layer or the main agent film, the catalyst can more easily permeate into and diffuse in the main agent layer or the main agent film, which makes it possible to obtain a bonded body that has a sufficient adhesive strength.

DETAILED DESCRIPTION OF PREFERRED EMBODIMENTS

Hereinbelow, the present invention will be described in detail.

The particulars shown herein are by way of example and for purposes of illustrative discussion of the embodiments of the present invention only, and presented in the cause of providing what is believed to be the most useful and readily understood description of the principles and conceptual aspects of the present invention. In this regard, no attempt is made to show structural details of the present invention in more detail than is necessary for the fundamental understanding of the present invention, and the description makes apparent to those skilled in the art how the several forms of the present invention may be embodied in practice.

1. Bonding Method

A bonding method according to the present invention includes: a main agent layer forming step in which a main agent layer made of an adhesive main agent containing a thermoplastic resin having a cross-linkable group is formed; and a catalyst contact step in which a catalyst that promotes formation of a cross-link derived from the cross-linkable group is brought into contact with a surface of the main agent layer to allow the catalyst to permeate into the main agent layer.

The following bonding methods of embodiments (1) to (5) are more specific bonding methods.

Embodiment (1); A method including a step in which a main agent layer is formed on a surface of one of adherends, a step in which a catalyst is applied onto the main agent layer, a step in which the main agent layer and the other adherend are caused to surface-contact with each other, and a step in which a laminated body obtained is heated and pressed in a layer thickness direction.

Embodiment (2); A method including a step in which a catalyst is applied onto one of two adherends, a step in which a main agent layer is formed on a surface onto which the catalyst has been applied, a step in which the other adherend is caused to surface-contact with a surface of the main agent layer, and a step in which a laminated body obtained is heated and pressed in a layer thickness direction.

Embodiment (3); A method including a step in which a main agent layer is formed on a surface of one of two adherends, a step in which a catalyst is applied onto the other adherend, a step in which the two adherends are caused to surface-contact with each other using the main agent layer and the catalyst-applied surface, and a step in which a laminated body obtained is heated and pressed in a layer thickness direction.

Embodiment (4); A method including a step in which a main agent film made of an adhesive main agent is formed, a step in which a catalyst is applied onto the main agent film, a step in which the main agent film is interposed between the two adherends, and a step in which a laminated body obtained is heated and pressed in a layer thickness direction.

Embodiment (5); A method including a step in which a main agent film made of an adhesive main agent is formed, a step in which a catalyst is applied onto at least one of two adherends, a step in which the main agent film is interposed between the two adherends, and a step in which a laminated body obtained is heated and pressed in a layer thickness direction.

As described above, in the embodiments (1) to (3), a main agent layer is formed on an adherend surface or an adherend surface onto which a catalyst has been applied. On the other hand, in the embodiments (4) and (5), a main agent film to be used as a main agent layer is formed, and two adherends are laminated in such a manner that the main agent film is interposed between them. Further, in the embodiments (2) and (3), the catalyst may further be applied onto the main agent layer while the total amount of the catalyst to be applied or the like is taken into consideration. Further, in the embodiment (4), the catalyst may be applied onto only one of the surfaces of the main agent film or both surfaces of the main agent film while the total amount of the catalyst to be applied or the like is taken into consideration. Further, in the embodiment (5), the catalyst may be applied onto only one of the two adherends or one of the two adherends and the other adherend while the total amount of the catalyst to be applied is taken into consideration.

A method for applying the adhesive main agent for forming a main agent layer onto the adherend surface of an adherend or the adherend surface of an adherend onto which the catalyst has been applied is not particularly limited, and examples thereof include application methods using a roll coater, a bar coater, a wire bar coater, and a curtain flow coater. The main agent film can be formed by, for example, a method in which the adhesive main agent is extrusion-molded in the form of a sheet using an extrusion molding machine or the like on the surface of a film such as a polytetrafluoroethylene film poor in adhesiveness and then solidified, and the thus formed main agent film is released from the film.

Further, a method for applying the catalyst onto the surface of a main agent layer or a main agent film or the adherend surface of an adherend is not particularly limited, either, and may be a scat method, a spraying method such as air spraying, or brush coating.

In the bonding methods of the embodiments (1) to (5), a main agent layer or a main agent film is formed, a catalyst then comes into contact with the main agent layer, the main agent film, or an adherend, a laminated body is then formed, and the laminated body is then heated and pressed to produce a bonded body. In such a process, the adhesive main agent is cured due to a reduction in temperature or the like, and is further cured through contact with the catalyst due to the promotion of a cross-linking reaction. Therefore, the time between the formation of a main agent layer or a main agent film and the bonding of two adherends with the main agent layer or the main agent film interposed therebetween by heating and pressing, that is, the open time is limited.

When the open time is short, formation of a main agent layer or a main agent film, lamination of adherends or the like, and heating and pressing of a laminated body all need to be performed in a predetermined place. Therefore, for example, an adherend on which a main agent layer has been formed or a formed main agent film cannot be transferred to another place to perform lamination, heating, and pressing thereafter. For these reasons, the open time is preferably at least 2 hours or longer, and particularly preferably about 4 hours.

Further, the time until the adhesive main agent in an applicator is applied onto the adherend surface of an adherend or onto the adherend surface of an adherend onto which the catalyst has been applied to form a main agent layer or a main agent film, that is, pot life is also limited, and therefore there is also time limitation in consideration of pot life in addition to the limitation of the open time.

Further, the time between the heating and pressing of a laminated body and the development of a desired adhesive strength such as peel strength, that is, the aging time is not particularly limited. However, from a practical viewpoint in industry, the aging time is preferably as short as possible. This aging time usually needs to be long when a main agent layer or a main agent film to be used as a main agent layer is thick, but may be short when a main agent layer or a main agent film to be used as a main agent layer is thin. For example, when a main agent layer or a main agent film has a thickness of about 10 to 500 µm, particularly about 70 to 200 µm, more particularly about 70 to 150 µm, the aging time is preferably about 240 hours or shorter, more preferably about 150 hours or shorter, and particularly about 120 hours or shorter.

2. Adhesive Main Agent

The adhesive main agent contains a thermoplastic resin having a cross-linkable group. Examples of the cross-linkable group include an alkoxysilyl group, an oxazoline group, an acid anhydride group, and a carbodiimide group, and examples of the thermoplastic resin include a polyolefin, a polyurethane, and an acrylic resin. Examples of the alkoxysilyl group as a cross-linkable group include a trimethoxysilyl group, a methyldimethoxysilyl group, a dimethylmethoxysilyl group, a triethoxysilyl group, a methyldiethoxysilyl group, and a methylmethoxyethoxysilyl group. Among them, an alkoxysilyl group having a low cohesive strength is preferred, and from the viewpoint of curing speed etc., a trimethoxysilyl group and a methyldimethoxysilyl group are preferred.

Further, when the thermoplastic resin is a polyolefin, examples of an olefin as a skeleton of the polyolefin include olefin monomers such as ethylene, propylene, 1-butene, 1-pentene, 3-methyl-1-pentene, 4-methyl-1-pentene, 3-methyl-1-butene, 1-hexene, and 1-octene. A cross-linkable group such as alkoxysilane is bonded to these olefin monomers.

The polyolefin content of the adhesive main agent is not particularly limited. When the amount of the adhesive main agent is taken as 100% by mass, the polyolefin content is preferably 10% by mass or more (may be 100% by mass), more preferably 30% by mass or more, and particularly 40% by mass or more.

As the olefin homopolymer, polyethylene or polypropylene is heavily used. Examples of the copolymer include copolymers of ethylene and 1-butene, propylene, 1-hexene, 1-octene, and 4-methyl-1-pentene. As the copolymer, a copolymer of ethylene and propylene is heavily used. The copolymer may be either a random copolymer or a block copolymer, but is preferably a block copolymer from the viewpoint of excellent impact resistance. These polyolefins may be used singly or in combination of two or more of them.

[3] Catalyst

The catalyst that promotes formation of a cross-link derived from the cross-linkable group can appropriately be selected depending on the kind of cross-linkable group used and the kind of thermoplastic resin used. For example, when the cross-linkable group is an alkoxysilyl group and the thermoplastic resin is a polyolefin, the catalyst that promotes formation of a siloxane cross-link derived from the alkoxysilyl group may be, for example, an amine-based compound or a metallic catalyst. Examples of the amine-based compound to be used include a monoamine compound, a diamine compound, a triamine compound, a cyclic amine compound, an alcohol amine compound, an ether amine compound, and a reactive-type amine-based compound obtained by hydroxylating or aminating part of the structure of each of these compounds to allow a reaction with a polyisocyanate.

Specific examples of the amine-based compound include methanolamine, ethanolamine, propanolamine, N-methylmethanolamine, N-methylethanolamine, N-methylpropanolamine, N,N-dimethylmethanolamine, N,N-dimethylethanolamine, N,N-diethylethanolamine, N,N-dipropylethanolamine, N,N-dimethylbutanolamine, N,N-diethylbutanolamine, N,N-dipropylbutanolamine, N-(aminomethyl)methanolamine, N-(aminomethyl)ethanolamine, N-(aminomethyl)propanolamine, N-(aminoethyl)methanolamine, N-(aminoethyl)ethanolamine, and N-(aminoethyl)propanolamine.

Other specific examples of the amine-based compound include triethylamine, N,N-dimethylcyclohexylamine, triethylenediamine, tetramethylguanidine, N,N-dipolyoxyethylenestearylamine, N,N'-dimethylpiperazine, N-methyl-N'-(2-dimethylamino)-ethylpiperazine, N-methylmorpholine, N-ethylmorpholine, N—(N',N'-dimethylaminoethyl)-morpholine, and 1,2-dimethylimidazole. These amine-based compounds constituting the catalyst may be used singly or in combination of two or more of them.

As the amine-based compound, these various compounds mentioned above as examples may be used. However, the amine-based compound is preferably a tertiary amine, and a substituent linked to the nitrogen atom of a tertiary amine is preferably a methyl group. The amine-based compound is preferably a polyamine. Examples of such an amine-based compound include bis-(2-dimethylaminoethyl)ether (SP value; 8.1, molecular weight; 160.0), N,N,N',N'-tetramethylhexamethylenediamine (SP value; 8.0, molecular weight; 172.3), 1-methyl-4'-(dimethylaminoethyl)piperazine (SP value; 8.9, molecular weight; 171.3), N,N-dimethyldodecylamine (SP value; 8.0, molecular weight; 213.4), and N,N',N''-tris(3-dimethylaminopropyl)hexahydro-s-triazine (SP value; 8.9, molecular weight; 342.6).

Examples of the metallic catalyst include organometallic compounds such as carboxylates of metals such as tin, zinc, iron, lead, cobalt, and titanium. These metallic catalysts may be used singly or in combination of two or more of them.

The amount of the catalyst to be applied can be set in consideration of the kind of polyolefin used, the kind of alkoxysilyl group used, the amount of the alkoxysilyl group linked to the polyolefin, the kind of catalyst used, a desired adhesive strength such as peel strength, etc. When the total amount of the polyolefin and the catalyst is taken as 100% by mass, the amount of the catalyst to be applied may usually be 0.1 to 5.0% by mass, particularly 0.5 to 2.0% by mass. If the amount of the catalyst applied is less than 0.1% by mass, there is a case where siloxane cross-links are not sufficiently formed, and therefore a desired adhesive strength such as peel strength is not developed. On the other hand, it makes no sense to apply the catalyst in an amount exceeding a predetermined amount.

The catalyst is applied onto a main agent layer made of the adhesive main agent, a main agent film to be used as a main agent layer, or the adherend surface of an adherend. In any of these cases, the catalyst preferably quickly and uniformly permeates into and diffuses in the adhesive main agent after contact with the adhesive main agent. In order to allow the catalyst to quickly and uniformly permeate into and diffuse in the adhesive main agent, the difference between the solubility parameter (SP) value of the adhesive main agent and the SP value of the catalyst is preferably small.

When the solubility parameter of the adhesive main agent is defined as $SP_1$, and the solubility parameter of the catalyst is defined as $SP_2$, the difference between these SP values represented as $|SP_1-SP_2|$ may satisfy $|SP_1-SP_2|\leq 5$, and may particularly satisfy $|SP_1-SP_2|\leq 4$, but preferably satisfies $|SP_1-SP_2|\leq 3$, and more preferably satisfies $|SP_1-SP_2|\leq 2$.

It is to be noted that the SP value is calculated by a method described in the Fedors method (Polymer Engineering and Science, February, 1974, Vol. 14, No. 2, pp. 147 to 154).

Further, the catalyst more easily diffuses when having a lower molecular weight. Therefore, the molecular weight of the catalyst is preferably low to the extent that the function of the catalyst does not deteriorate. Depending on the kind of catalyst used, the molecular weight of the catalyst is preferably 500 or less, and more preferably 320 or less. The molecular weight of the catalyst is further preferably 270 or less, and particularly more preferably 230 or less. Further, the molecular weight of the catalyst is preferably 35 or more, 55 or more, or 80 or more, and particularly preferably 100 or more. When having a molecular weight within such a range, the catalyst uniformly permeates into and easily diffuses in a main agent layer or a main agent film containing the adhesive main agent, which makes it possible to more easily form a uniform adhesive layer. However, when the catalyst has a low boiling point and therefore quickly evaporates after applied onto a main agent layer or the like containing the adhesive main agent, it is preferred that the catalyst be usually used in an environment where evaporation is controlled (e.g., in a compressed-air environment).

As described above, it is preferred that the catalyst have a low molecular weight and a solubility parameter such that a difference from the solubility parameter of the adhesive main agent is small. The solubility parameter ($SP_2$) of the catalyst to be used depends on the kind of adhesive main agent used, but is usually 5 to 14, 5 to 12, or 6 to 11, particularly 6 to 10.5 or 7 to 9.5. When having such a solubility parameter, the catalyst can easily be selected which shows excellent performance and has a solubility parameter such that the difference from the solubility parameter of the polyolefin having a cross-linkable group is small.

It is to be noted that the thickness of a main agent layer or a main agent film to be used as a main agent layer can appropriately be set depending on the kind of adherend, the intended use of a laminated body, etc., and may be, for example, 20 to 500 μm, particularly 50 to 300 μm, more particularly 70 to 200 μm. Further, the thickness of a main agent layer or a main agent film to be used as a main agent layer needs to be set in consideration of the open time and the time required to develop a desired adhesive strength such as peel strength, that is, the aging time.

[4] Adherends

The two adherends are not particularly limited, and various adherends can be used. Examples of the adherends to be used include fabrics, natural leathers, synthetic leathers, and thermoplastic resin sheets. Examples of fibers used for fabrics such as cloths, woven cloths, and knitted cloths include natural fibers such as cotton, hemp, sheep wool, and silk, regenerated fibers such as cupra and rayon, semisynthetic fibers such as acetate, synthetic resin fibers such as polyester-based fibers, acrylic fibers, polyamide-based fibers, and polyolefin-based fibers, composite fibers using these fibers, and blended fibers.

A thermoplastic resin used for forming the thermoplastic resin sheet is not particularly limited, and the resin can be preferably formed into a sheet by extrusion molding, injection molding, or the like. Examples of such a thermoplastic resin include polyolefin resins, polyamide resins, polyester resins, and polyacrylic resins.

[5] Intended Use of Bonded Body

Bonded bodies formed by the bonding methods of the present invention can be used as products in a wide range of fields such as vehicle-related fields and construction-related fields. In vehicle-related fields, the bonded bodies are suitable as interior, exterior, and structural materials of vehicles. Specific examples thereof include door trims, pillar garnishes, seat back boards, roof trims, instrument panels, console boxes, dashboards, and deck trims. Further, the bonded bodies can be used also for various means of transportations and conveyance such as railway vehicles, boats and ships, and airplanes.

In construction-related fields, the bonded bodies are suitable as interior, exterior, and structural materials of various architectural structures. Examples thereof include door surface materials, door structural materials, and surface and structural materials of various articles of furniture (e.g., desks, chairs, racks, chests of drawers).

EXAMPLES

Test Example (Evaluation of Diffusibility and Permeability of Catalyst in and into Main Agent Layer Made of Adhesive Main Agent)

An alkoxysilyl group-containing polyolefin having an SP value of 8.0 was used as an adhesive main agent to form a main agent film having a thickness of 600 μm. After a lapse of 16 hours, (1) N,N,N',N'-tetramethylhexamethylenediamine having an SP value of 8.0 and a molecular weight of 172.3, (2) 1-methyl-4'-(dimethylaminoethyl)piperazine having an SP value of 8.9 and a molecular weight of 171.3, or (3) tin dibutyl dilaurate having an SP value of 8.9 and a molecular weight of 631.6 was applied as a catalyst in an amount of 35 g/m², respectively.

After 72-hour aging from the application, the thickness of the adhesive main agent cured by permeation and diffusion of the catalyst was evaluated using an imaging infrared spectrophotometer. As a result, the thickness of the adhesive main agent cured by the catalyst (1) measured from the surface of the main agent film was about 500 μm, the thickness of the adhesive main agent cured by the catalyst (2) measured from the surface of the main agent film was about 500 μm, and the thickness of the adhesive main agent cured by the catalyst (3) measured from the surface of the main agent film was about 200 μm. This indicates that when the thickness of main agent layer of a product (bonded body) is set to 100 μm, all these catalysts offer sufficient performance. It is to be noted that when no catalyst was applied, the adhesive main agent was not cured at all by 72-hour aging, but was cured over the entire thickness by the action of a moisture curing reaction when allowed to stand for 1 month.

Example 1

As two adherends, a polypropylene sheet having a thickness of 20 mm and a polyolefin-based elastomer sheet having a thickness of 25 mm were used. Among them, a product (manufactured by H.B. Fuller Company under the trade name of "Swiftlock2003") that is an adhesive agent containing a polyolefin resin having an alkoxysilyl group and has a SP value of 8.0 was applied onto the adherend surface of the polyolefin-based elastomer sheet with a roll coater at a temperature of 150° C. in an amount of 100 g/m² to form a main agent layer having a thickness of 100 μm. After a lapse of 30 minutes, the catalyst (1) used in the above test example was uniformly applied by air spraying as a catalyst onto the surface of the main agent layer in a planar direction in an amount of 0.1 g/m². Further, after a lapse of 30 minutes from the application of the catalyst, the polypropylene sheet heated to 80° C. and the polyolefin-based elastomer sheet having the main agent layer formed thereon and heated to 100° C. were laminated and pressed at a pressure of 0.1 MPa for 15 seconds to obtain a bonded sheet. Then, after 100-hour aging, a 180° peel strength was measured at a tension rate of 200 mm/min in accordance with JIS K 6854-2 (peel strength at 100° C.). As a result, the peel strength was as sufficiently high as 8.4 N/25 mm.

Example 2 and Comparative Example 1

A main agent layer was formed and a catalyst (2) was applied onto the main agent layer in the same manner as in Example 1 except that the catalyst (2) used in the above test example was used as a catalyst, two adherends were laminated, pressed to be bonded together, and aged under the same conditions as in Example 1 to obtain a bonded sheet (Example 2), and peel strength was measured in the same manner as in Example 1. As a result, the peel strength was as sufficiently high as 7.9 N/25 mm. On the other hand, two adherends were laminated, pressed to be bonded together, and aged in the same manner as in Example 1 except that no catalyst was applied (Comparative Example 1), and peel strength was measured in the same manner as in Example 1 and found to be as poor as 5.4 N/25 mm.

It is to be noted that the foregoing examples have been provided merely for the purpose of explaining and are in no way to be construed as limiting of the present invention. While the present invention has been described with reference to exemplary embodiments, it is understood that the words used herein are words of description and illustration, rather than words of limitation. Changes may be made within the purview of the appended claims, as presently stated and as amended, without departing from the scope and spirit of the present invention in its aspects. Although the present invention has been described herein with reference to particular structures, materials, and embodiments, the present invention is not intended to be limited to the particulars disclosed herein; rather the present invention extends to all functionally equivalent structures, methods, and uses, such as are within the scope of the appended claims.

The bonding method according to the present invention can be used in various technical fields. More specifically, the bonding method according to the present invention can suitably be used in technical fields involving bonded bodies for use in various industries such as interior and exterior materials of vehicles such as automobiles and railway vehicles and interior and exterior materials of airplanes, boats and ships, and buildings.

What is claimed is:

1. A bonding method for bonding two adherends using an adhesive main agent that contains a thermoplastic resin having a cross-linkable group and a catalyst that promotes formation of a crosslink derived from the cross-linkable group in the thermoplastic resin, the method comprising:
    forming a main agent layer made of the adhesive main agent; and
    contacting the catalyst with a surface of the main agent layer to allow the catalyst to permeate into the main agent layer,
wherein a skeleton of the thermoplastic resin is a polyolefin,
    the cross-linkable group include at least one of an alkoxysilyl group, an oxazoline group, an acid anhydride group, and a carbodiimide group,
    when a solubility parameter of the adhesive main agent is defined as SP1 and a solubility parameter of the catalyst is defined as SP2, the SP1 and the SP2 satisfy |SP1−SP2|≤5,
    the catalyst is a compound having a molecular weight of 500 or less, and
    the catalyst is an amine-based compound.

2. The bonding method according to claim 1, comprising:
forming the main agent layer on adherend surface of one of the adherends;
applying the catalyst onto the main agent layer;
laminating the one of the adherends and another adherend so that the main agent layer with the catalyst and an adherend surface of the other adherend are caused to abut on each other; and
heating and pressing a laminated body obtained in a layer thickness direction.

3. The bonding method according to claim 1, comprising:
applying the catalyst onto an adherend surface of one of the adherends;
forming the main agent layer on a surface onto which the catalyst has been applied;
laminating the one of the adherends and another adherend so that the main agent layer with the catalyst and an adherend surface of the other adherend are caused to abut on each other; and
heating and pressing a laminated body obtained in a layer thickness direction.

4. The bonding method according to claim 1, comprising:
forming the main agent layer on an adherend surface of one of the adherends;
applying the catalyst onto an adherend surface of another adherend;
laminating the one of the adherends and the other adherend so that the main agent layer and a catalyst-applied surface of the other adherend are caused to abut on each other; and
heating and pressing a laminated body obtained in a layer thickness direction.

5. The bonding method according to claim 1, comprising:
forming a main agent film made of the adhesive main agent;
applying the catalyst onto at least one of surfaces of the main agent film;
laminating the two adherends in such a manner that the main agent film with the catalyst is interposed between them; and
heating and pressing a laminated body obtained in a layer thickness direction.

6. The bonding method according to claim 1, comprising:
forming a main agent film made of the adhesive main agent;
applying the catalyst onto an adherend surface of at least one of the two adherends;
laminating the two adherends at least one of which has a catalyst applied thereon in such a manner that the main agent film with the catalyst is interposed between them; and
heating and pressing a laminated body obtained in a layer thickness direction.

7. The bonding method according to claim 1, wherein the amine-based compound is at least one of bis-(2-dimethyl-aminoethyl)ether, N,N,N',N'-tetramethylhexamethylenediamine, 1-methyl-4'-(dimethylaminoethyl)piperazine, N,N,N',N'-tetramethylethylenediamine, and N,N-dimethyldodecylamine.

8. The bonding method according to claim 1, wherein the main agent layer has a thickness of 10 to 500 μm.

9. The bonding method according to claim 1, when a total amount of the thermoplastic resin and the catalyst is taken as 100% by mass, the catalyst is in an amount of 0.1 to 5.0% by mass.

10. The bonding method according to claim 1, when a total amount of the thermoplastic resin and the catalyst is taken as 100% by mass, the catalyst is in an amount of 0.5 to 2.0% by mass.

* * * * *